(12) United States Patent
Lee et al.

(10) Patent No.: US 11,962,921 B2
(45) Date of Patent: Apr. 16, 2024

(54) DEVICE AND METHOD FOR PROCESSING SPECTRUM DATA OF IMAGE SENSOR

(71) Applicants: SAMSUNG ELECTRONICS CO., LTD., Suwon-si (KR); Korea University Research and Business Foundation, Seoul (KR)

(72) Inventors: Suyeon Lee, Seoul (KR); Q-Han Park, Seoul (KR); Unjeong Kim, Osan-si (KR); Hyunjun Ma, Seoul (KR)

(73) Assignees: SAMSUNG ELECTRONICS CO., LTD., Suwon-si (KR); Korea University Research and Business Foundation, Seoul (KR)

( * ) Notice: Subject to any disclaimer, the term of this patent is extended or adjusted under 35 U.S.C. 154(b) by 0 days.

(21) Appl. No.: 17/845,582

(22) Filed: Jun. 21, 2022

(65) Prior Publication Data

US 2023/0128654 A1 Apr. 27, 2023

(30) Foreign Application Priority Data

Oct. 22, 2021 (KR) .................. 10-2021-0141643

(51) Int. Cl.
*H04N 25/62* (2023.01)
*H04N 9/67* (2023.01)

(52) U.S. Cl.
CPC ............. *H04N 25/62* (2023.01); *H04N 9/67* (2013.01)

(58) Field of Classification Search
CPC ...................................... H04N 25/62
USPC ..................................... 348/222.1
See application file for complete search history.

(56) References Cited

U.S. PATENT DOCUMENTS

| 7,286,719 | B2 | 10/2007 | Riley et al. |
| 8,054,352 | B2 | 11/2011 | Kim et al. |
| 8,285,018 | B2 | 10/2012 | Wang et al. |
| 9,395,244 | B2 | 7/2016 | Kurokawa et al. |
| 9,773,834 | B2 | 9/2017 | Peng et al. |
| 2002/0054237 | A1 | 5/2002 | Nichogi |

(Continued)

FOREIGN PATENT DOCUMENTS

| CN | 108896499 A | 11/2018 |
| CN | 111651720 A | 9/2020 |

(Continued)

OTHER PUBLICATIONS

Communication dated Mar. 30, 2023, issued by European Patent Office in European Patent Application No. 22194119.8.

(Continued)

*Primary Examiner* — Joel W Fosselman
(74) *Attorney, Agent, or Firm* — Sughrue Mion, PLLC

(57) ABSTRACT

Provided are a method and a device, for processing spectrum data of an image sensor. The method includes obtaining spectrum response signals corresponding to channels of spectrum data of light, the spectrum data being obtained from an object by an image sensor; determining a set of bases corresponding to the obtained spectrum response signals; performing, based on the determined set of bases, a change of basis on at least one basis included in the determined set of bases; and generating, by using a pseudo inverse, reconstructed spectrum data from the spectrum response signals on which the change of basis has been performed.

17 Claims, 12 Drawing Sheets
(1 of 12 Drawing Sheet(s) Filed in Color)

(56) References Cited

U.S. PATENT DOCUMENTS

| 2005/0073707 | A1* | 4/2005 | Yamazoe ............ H04N 1/6033 |
| | | | 358/1.9 |
| 2006/0198558 | A1 | 9/2006 | Riley et al. |
| 2007/0194356 | A1 | 8/2007 | Moon et al. |
| 2012/0019695 | A1 | 1/2012 | Qian et al. |
| 2014/0022544 | A1 | 1/2014 | Kurokawa et al. |
| 2016/0131891 | A1 | 5/2016 | Higaki |
| 2016/0187199 | A1 | 6/2016 | Brunk et al. |

FOREIGN PATENT DOCUMENTS

| JP | 2002-204364 A | 7/2002 |
| JP | 5165732 B2 | 3/2013 |
| JP | 2015-052663 A | 3/2015 |
| JP | 2019-28814 A | 2/2019 |
| JP | 2020-91256 A | 6/2020 |
| JP | 2020-94985 A | 6/2020 |

OTHER PUBLICATIONS

Communication dated Jun. 13, 2023, issued by Japanese Patent Office in Japanese Patent Application No. 2022-154528.

Nystrom, "Colorimetric and Multispectral Image Acquisition Using Model-Based and Empirical Device Characterization", 18th International Conference, Jun. 10, 2007, pp. 798-807.

Wangqing Li et al., "CMOS Sensor Cross-Talk Compensation for Digital Cameras", IEEE Transactions on Consumer Electronics, 2002, vol. 48, No. 2, pp. 292-297 (9 total pages).

Feng Li et al., "Comparison of objective metrics for image sensor crosstalk characterization", Proceedings of SPIE vol. 7876, Digital Photography VII, IS&T/SPIE Electronic Imaging, 2011, 13 pages, DOI: 10.1117/12.872494.

Leo Anzagira et al., "Color filter array patterns for small-pixel image sensors with substantial cross talk", Journal of the Optical Society of America A, vol. 32, No. 1, Dec. 4, 2014, pp. 28-34.

Alexander Getman et al., "Crosstalk, color tint, and shading correction or small pixel size image sensor", International Image Sensor Society, 2005, pp. 166-169.

Klaas Dijkstra et al., "Hyperspectral demosaicking and crosstalk correction using deep learning", Machine Vision and Applications, vol. 30, Jul. 26, 2018, pp. 1-21 (22 total pages), DOI: 10.1007/s00138-018-0965-4.

Communication dated Nov. 7, 2023, issued by the Korean Intellectual Property Office in Korean Patent Application No. 10-2021-0141643.

* cited by examiner

DEVICE AND METHOD FOR PROCESSING SPECTRUM DATA OF IMAGE SENSOR

CROSS-REFERENCE TO RELATED APPLICATION

This application is based on and claims priority under 35 U.S.C. § 119 to Korean Patent Application No. 10-2021-0141643, filed on Oct. 22, 2021, in the Korean Intellectual Property Office, the disclosure of which is incorporated by reference herein in its entirety.

BACKGROUND

1. Field

One or more example embodiments of the disclosure relate to a device and a method for processing spectrum data of an image sensor.

2. Description of the Related Art

Hyperspectral imaging is a combination of spectral analysis and image processing, for simultaneously obtaining spatial information and spectral information with respect to an object that is being measured. Hyperspectral imaging devices are capable of identifying the state, configuration, features, variations, etc. of an object through data obtained by a hyperspectral image sensor, so as to identify a material, and/or measure a degree of defect of a product, etc. However, in hyperspectral imaging systems, the resolution (e.g., the spatial resolution and/or spectral resolution) of an image sensor may be decreased due to an effect of crosstalk between pixels occurring as the pixel size of the image sensor is decreased. Therefore, in order for an image sensor to obtain image data having a high resolution, various image processing methods for compensating for the effect of crosstalk have been attempted.

SUMMARY

Provided are a device and a method for processing spectrum data of an image sensor. The objectives of the disclosure are not limited to those described above, and other technical objectives may be inferred from the following embodiments.

Additional aspects will be set forth in part in the description which follows and, in part, will be apparent from the description, or may be learned by practice of the presented embodiments of the disclosure.

According to an aspect of an example embodiment, there is provided a method of processing spectrum data, the method including: obtaining spectrum response signals corresponding to channels of spectrum data of light, the spectrum data being obtained from an object by an image sensor; determining a set of bases corresponding to the obtained spectrum response signals; performing, based on the determined set of bases, a change of basis on at least one basis included in the determined set of bases; and generating, by using a pseudo inverse, reconstructed spectrum data from the spectrum response signals on which the change of basis has been performed.

The determining the set of bases may include obtaining a principal component with respect to a spectrum response signal of each channel by using a principal component analysis (PCA) algorithm.

The set of bases may include bases, a number of which is less than or equal to a number of the channels.

The performing the change of basis may include: determining at least one basis having a singular value, which is less than a threshold value, among the bases corresponding to the obtained spectrum response signals; and replacing the singular value of the determined at least one basis with a certain singular value.

The certain singular value may be the threshold value or a lowest value among singular values of other bases, in the bases corresponding to the obtained spectrum response signals, each having a singular value greater than or equal to the threshold value.

The method may further include generating a hyperspectral image, based on the generated reconstructed spectrum data.

The generating the hyperspectral image may include generating an RGB image, which is color-converted from the reconstructed spectrum data by using a color matching function.

The channels of spectrum data may include three or more channels.

The threshold value may be determined based on a singular value of an n-th (n being a natural number) singular value, among singular values of the bases corresponding to the obtained spectrum response signals in an order from smallest to greatest.

According to an aspect of an example embodiment, there is provided a device for processing spectrum data, the device including: a light source configured to irradiate light toward an object; an image sensor configured to obtain spectrum response signals corresponding to channels of spectrum data of light, the spectrum data being obtained from the object by the image sensor; and a processor configured to: determine a set of bases corresponding to the obtained spectrum response signals; perform, based on the determined set of bases, a change of basis on at least one basis included in the determined set of bases; and generate, by using a pseudo inverse, reconstructed spectrum data from the spectrum response signals on which the change of basis has been performed.

The set of bases may be determined by obtaining a principal component with respect to a spectrum response signal of each channel by using a principal component analysis (PCA) algorithm.

The set of bases may include bases, a number of which is less than or equal to a number of the channels.

The processor may be further configured to determine at least one basis having a singular value less than a threshold value among the bases corresponding to the obtained spectrum response signals, and replace the singular value of the determined at least one basis with a certain singular value.

The certain singular value may be the threshold value or a lowest value among singular values of other bases, in the bases corresponding to the obtained spectrum response signals, each having a singular value greater than or equal to the threshold value.

The processor may be further configured to generate a hyperspectral image, based on the generated reconstructed spectrum data.

The processor may be further configured to generate the hyperspectral image by generating an RGB image, which is color-converted from the reconstructed spectrum data by using a color matching function.

The image sensor may include a multispectral image sensor configured to obtain spectrum data of three or more channels.

The threshold value may be determined based on a singular value of an n-th (n being a natural number) singular value, among singular values of the bases corresponding to the obtained spectrum response signals in an order from smallest to greatest.

According to an aspect of an example embodiment, there is provided a non-transitory computer-readable recording medium having recorded thereon a program for executing a method of processing spectrum data, the method including: obtaining spectrum response signals corresponding to channels of spectrum data of light, the spectrum data being obtained from an object by an image sensor; determining a set of bases corresponding to the obtained spectrum response signals; performing, based on the determined set of bases, a change of basis on at least one basis included in the determined set of bases; and generating, by using a pseudo inverse, reconstructed spectrum data from the spectrum response signals on which the change of basis has been performed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features, and advantages of certain embodiments of the disclosure will be more apparent from the following description taken in conjunction with the accompanying drawings, in which.

DETAILED DESCRIPTION

Figure 1:
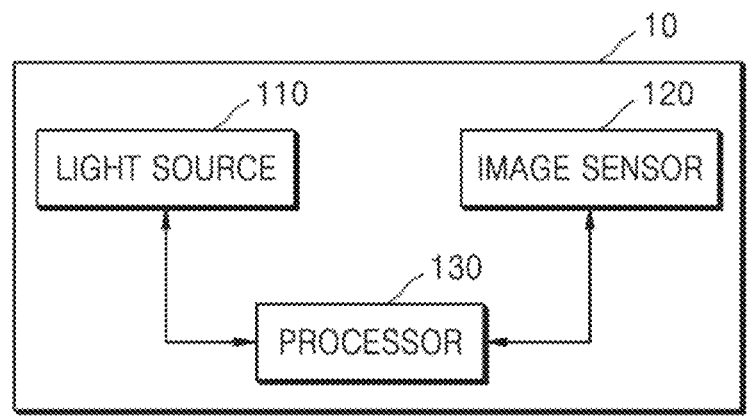
FIG. 1 is a block diagram illustrating an example of an imaging device according to some example embodiments.

Reference will now be made in detail to embodiments, examples of which are illustrated in the accompanying drawings, wherein like reference numerals refer to like elements throughout. In this regard, example embodiments may have different forms and should not be construed as being limited to the descriptions set forth herein. Accordingly, example embodiments are merely described below, by referring to the figures, to explain aspects of the invention. As used herein, the term "and/or" includes any and all combinations of one or more of the associated listed items. Expressions such as "at least one of," when preceding a list of elements, modify the entire list of elements and do not modify the individual elements of the list.

Although the terms used in the disclosure are selected from among common terms that are currently widely used in consideration of their function in the disclosure, the terms may be different according to an intention of one of ordinary skill in the art, a precedent, or the advent of new technology. Also, in particular cases, the terms are discretionally selected by the applicant of the disclosure, in which case, the meaning of those terms will be described in detail in the corresponding part of the detailed description. Therefore, the terms used in the disclosure are not merely designations of the terms, but the terms are defined based on the meaning of the terms and content throughout the disclosure.

In the description of embodiments, it will be understood that when an element is referred to as being "connected to" another element, it may be "directly connected to" the other element or be "electrically connected to" the other element through an intervening element. The singular expression also includes the plural meaning as long as it is not inconsistent with the context. When an element is referred to as "including" a component, the element may additionally include other components rather than excluding other components as long as there is no particular opposing recitation.

The terms such as "include" or "comprise" used herein should not be construed as necessarily including all various elements or operations described herein and should be understood that some of the elements or operations may be omitted or additional elements or operations may be further provided.

In addition, although the terms such as "first" or "second" may be used herein to describe various elements, these elements should not be limited by these terms. These terms are only used to distinguish one element from another element.

It should be understood that the scope of the example embodiments is not limited by the description of certain embodiments below and matters that can be easily derived by those of ordinary skill in the art fall within the scope of the example embodiments. Hereinafter, exemplary embodiments will be described in detail with reference to the accompanying drawings below.

FIG. 1 is a block diagram illustrating an example of an imaging device according to some example embodiments.

Referring to FIG. 1, an imaging device 10 may be any device capable of analyzing characteristics of an object or identifying the object. For example, the imaging device 10 may correspond to an imaging system using a hyperspectral or multispectral imaging technique, but is not limited thereto. The object may include a person, a thing, a terrain, a plant, and the like, and may be changed without limitation depending on a field in which the imaging device 10 may be used.

Referring to FIG. 1, the imaging device 10 may include at least one light source 110, at least one image sensor 120, and at least one processor 130. However, only components related to some example embodiments are illustrated in the imaging device 10 of FIG. 1. Therefore, it is apparent to those skilled in the art that the imaging device 10 may further include other general-purpose components in addition to the components illustrated in FIG. 1. For example, the imaging device 10 may further include hardware components such as a light source, a memory, etc.

Furthermore, even an imaging device including only some of the components illustrated in FIG. 1 but capable of achieving the objective of the disclosure may correspond to the imaging device 10. For example, the imaging device 10 may include only the at least one image sensor 120 and the at least one processor 130, and the at least one light source 110 may be external to the imaging device 10.

The memory, which may be included in the imaging device 10, may be hardware for storing various pieces of data processed by the imaging device 10, and for example, may store data that has been processed by and data to be processed by the imaging device 10. In addition, the memory may store applications, drivers, etc. to be executed by the imaging device 10.

The memory may include random-access memory (RAM) such as dynamic RAM (DRAM) or static SRAM, read-only memory (ROM), electrically erasable programmable ROM (EEPROM), a compact disc-ROM (CD-ROM), a Blu-ray or other optical disk storage, a hard disk drive (HDD), a solid-state drive (SSD), or flash memory, and may also include other external storage devices accessible by the imaging device 10.

The at least one light source 110 may refer to a device for irradiating light toward the object. The at least one light source 110 may irradiate light of a plurality of different wavelength bands toward the object. For example, the at least one light source 110 may selectively irradiate, toward the object, light of a first wavelength band (e.g., a range of 400 nm to 700 nm) and light of a second wavelength band (e.g., a range of 250 nm to 400 nm) that is different from the first wavelength band. However, the wavelength bands of light irradiated by the at least one light source 110 may be variously set.

The at least one light source 110 may be a light-emitting diode (LED) or a fluorescent lamp that irradiates broad light in a visible light band, or may be a laser diode that irradiates high-intensity, short-wavelength light. However, the disclosure is not limited thereto. The at least one light source 110 may emit light of a wavelength band suitable for obtaining information about the object.

In addition, the at least one light source 110 may be a single light source capable of selectively irradiating, toward the object, light of a plurality of different wavelength bands. However, the disclosure is not limited thereto, and the at least one light source 110 may include a plurality of light sources each irradiating light of one wavelength band. In addition, the at least one light source 110 may include a plurality of light sources capable of selectively irradiating, toward the object, light of a plurality of different wavelength bands.

The at least one image sensor 120 may refer to a device for obtaining spectrum data from light that is scattered, emitted, or reflected from the object, or absorbed by the object. However, the disclosure is not limited thereto, and the at least one image sensor 120 may obtain spectrum data from light transmitted or refracted through the object. In an example, when light generated by the light source 110 or natural light is irradiated toward the object, the object may absorb, scatter, emit, or reflect the light, and the image sensor 120 may measure spectrum data of the light absorbed, scattered, emitted, or reflected by or from the object. Because the spectrum data may be different depending on the types of materials constituting the object, the types of the materials constituting the object may be estimated by analyzing the measured spectrum data.

The spectrum data obtained by the image sensor 120 may include spectrum data (or a spectrum signal) of a plurality of channels corresponding to respective wavelengths. Here, the bandwidth and number of channels of each wavelength may be variously set. For example, the image sensor 120 may be a multispectral image sensor capable of obtaining spectrum data of at least three channels.

According to some example embodiments, the spectrum data obtained by the image sensor 120 may include at least one of a variety of spectra, such as a Raman spectrum, a visible spectrum, a fluorescence spectrum, a microwave spectrum, an infrared spectrum, an X-ray spectrum, etc. However, the disclosure is not limited thereto. Here, the Raman spectrum may refer to a spectrum obtained when high-intensity, short-wavelength light is irradiated toward the object by using a light source such as a laser diode, and then light scattered or emitted from the object is measured at a wavelength band different from the wavelength band of the light source.

Although FIG. 1 illustrates that the imaging device 10 includes only one image sensor 120, the imaging device 10 may include two or more image sensors. In the case of the imaging device 10 including two or more image sensors, the types of spectrum data obtained by the respective image sensors may be different from each other.

The image sensor 120 may obtain the spectrum data by using at least one of a grating and a filter array. The grating may correspond to a device that performs spectroscopy by using refraction, reflection, or diffraction of light, and the filter array may correspond to a device that performs spectroscopy by using filters that selectively transmit or block a certain wavelength or wavelength range.

The image sensor 120 may obtain a visible image or a hyperspectral image of the object by measuring light in a wavelength band of, for example, 300 nm to 700 nm. However, the disclosure is not limited thereto, and the at least one image sensor 120 may measure light in an arbitrary wavelength band suitable for obtaining information about the object.

The image sensor 120 may include a photodiode array, a charge-coupled device (CCD) sensor, or a complementary metal-oxide semiconductor (CMOS) sensor, which is capable of obtaining a visible image including information about the appearance, such as the color or shape, of the object. In addition, the image sensor 120 may obtain a hyperspectral or multispectral image including information about fluorescence emitted from the object. Certain indicator materials of the object may emit fluorescence as light is emitted thereto from the light source 110, and parameters indicating the amounts of the indicator materials may be obtained from the hyperspectral or multispectral image. Although an example of hyperspectral imaging will be described below, the disclosure is not limited thereto, and for example, the example embodiments may be implemented by using multispectral and hyperspectral imaging techniques.

The at least one processor 130 serves to perform an overall function for controlling the imaging device 10. For example, the at least one processor 130 may control the operation of the at least one light source 110 and the at least one image sensor 120. The at least one processor 130 may be implemented as an array of a plurality of logic gates, or may be implemented as a combination of a general-purpose microprocessor and a memory storing a program executable by the microprocessor.

The at least one processor 130 may obtain first information about the object based on the visible image obtained by the at least one image sensor 120, and obtain second information about the object based on the obtained first information and the hyperspectral image obtained by the image sensor 120. As described above, the processor 130 may obtain the second information by comprehensively considering information obtained by analyzing the visible image rather than using only information obtained by analyzing the hyperspectral image, and thus, the accuracy of the second information about the object may be increased.

For example, the first information may include information about the appearance of the object, and the second information may include information about material parameters of the object. However, the disclosure is not limited thereto.

Figure 2:
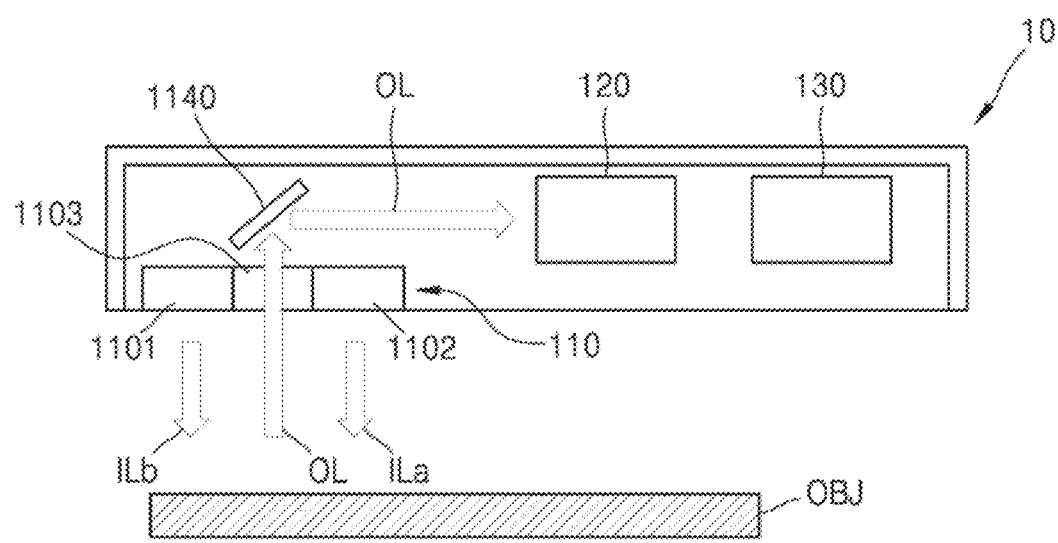
FIG. 2 is a conceptual diagram of an imaging device according to some example embodiments.
Figure 3:
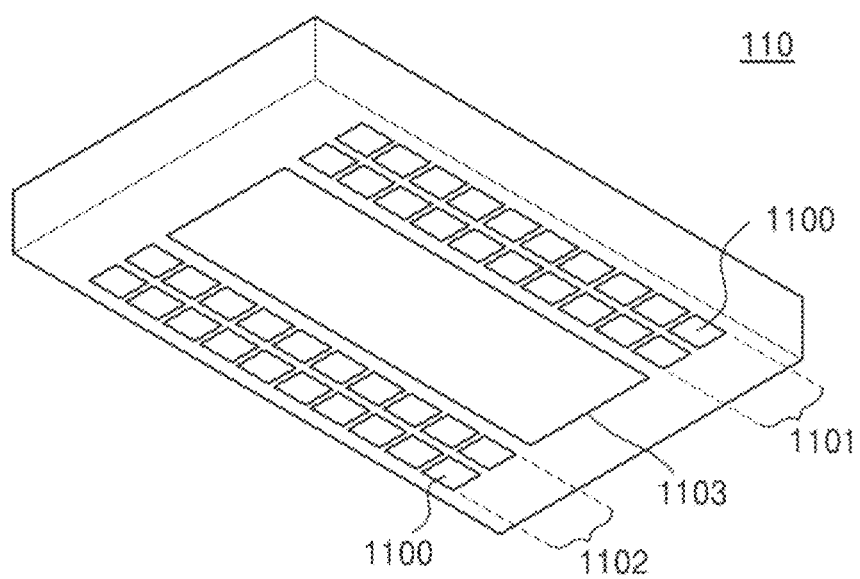
FIG. 3 is a conceptual diagram of an example of a light source of FIG. 2.
Figure 4:
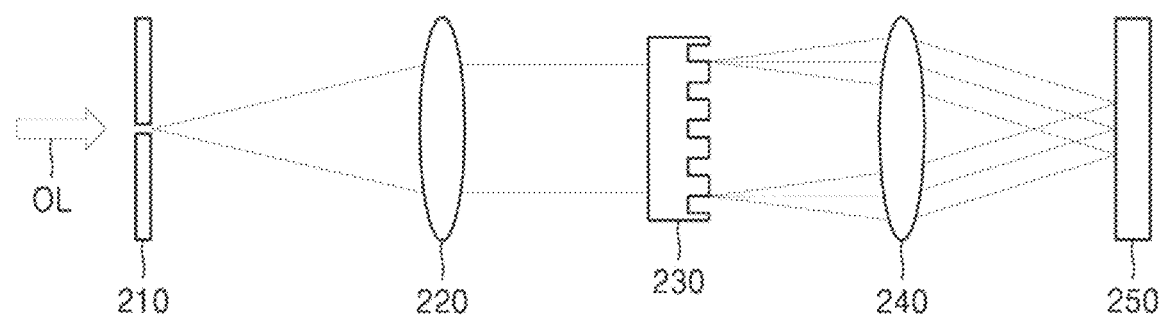
FIG. 4 is a conceptual diagram of an example of an image sensor of FIG. 2.
Figure 5:
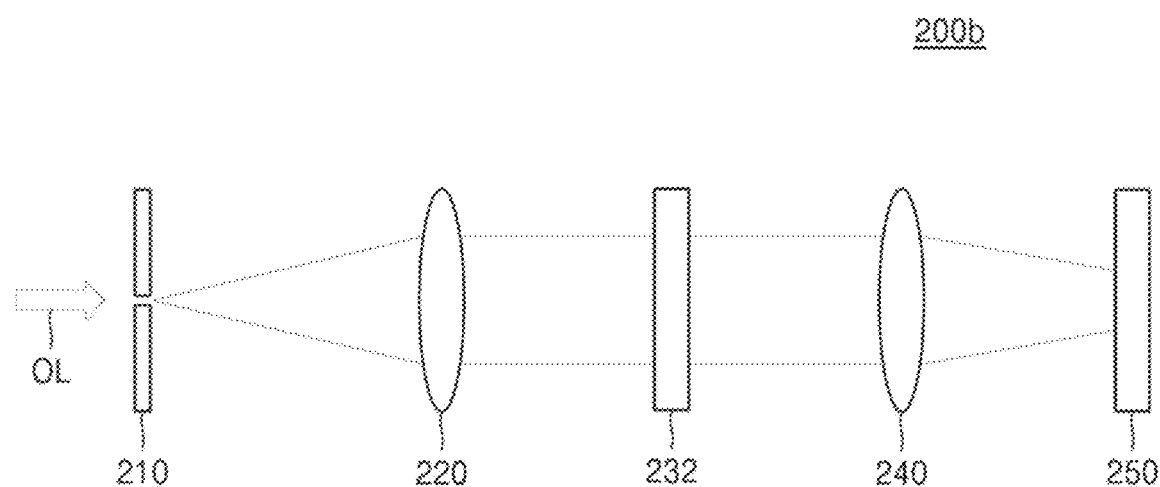
FIG. 5 is a conceptual diagram illustrating an example of the image sensor of FIG. 2.

FIG. 2 is a conceptual diagram of the imaging device 10 according to some example embodiments. FIG. 3 is a conceptual diagram of the light source 110 of FIG. 2. FIG. 4 is a conceptual diagram of an example of the image sensor 120 of FIG. 2. FIG. 5 is a conceptual diagram illustrating an example of the image sensor 120 of FIG. 2.

Referring to FIGS. 2 to 5, the imaging device 10 may include the light source 110, the image sensor 120, and the processor 130, and may perform imaging of an object OBJ.

The light source 110 may face the object OBJ. The light source 110 may emit rays of inspection light ILa and ILb toward the object OBJ. As illustrated in FIG. 3, the light source 110 may include a first light source array 1101, a second light source array 1102, and a transmission window 1103. The first light source array 1101 and the second light source array 1102 may be spaced apart from each other with the transmission window 1103 therebetween. Each of the first light source array 1101 and the second light source array 1102 may include a plurality of light sources 1100 arranged in one direction. For example, the plurality of light sources 1100 may be arranged along the transmission window 1103. Although FIG. 3 illustrates that the plurality of light sources 1100 of each of the first light source array 1101 and the second light source array 1102 are arranged in two columns, the disclosure is not limited thereto. For example, the plurality of light sources 1100 may include LEDs.

The object OBJ exposed to the rays of inspection light ILa and ILb may emit fluorescence OL. The fluorescence OL may pass through the transmission window 1103 and reach the inside of the imaging device 10. The transmission window 1103 may include a transparent material. For example, the transmission window 1103 may include transparent plastic or glass. In an example, the transmission window 1103 may include a material having high durability at low temperature. The fluorescence OL may be provided to the image sensor 120. For example, the optical path of the fluorescence OL may be adjusted by an optical path adjustment element 1140 such that the fluorescence OL is provided to the image sensor 120. The image sensor 120 may include a hyperspectral camera.

In an example, the image sensor 120 may include a dispersive element 230 as illustrated in FIG. 4. An image sensor 200a (see FIG. 4) may include a slit element 210, a collimating lens 220, the dispersive element 230, a condensing lens 240, and a sensor 250. The slit element 210 may be used to extract a required portion of the fluorescence OL. In an example, the fluorescence OL having passed through the slit element 210 may diverge. The collimating lens 220 may adjust the size of the fluorescence OL so as to convert the fluorescence OL into parallel light or convergent light. For example, the collimating lens 220 may include a convex lens. The dispersive element 230 may split the fluorescence OL provided from the collimating lens 220. Although FIG. 4 illustrates that the dispersive element 230 is a grating, the disclosure is not limited thereto. In another example embodiment, the dispersive element 230 may be a prism. The split fluorescence OL may pass through the condensing lens 240 and then be provided to the sensor 250. For example, the condensing lens 240 may include a convex lens. The split fluorescence OL may be provided to different positions of the sensor 250 according to wavelengths. The sensor 250 may measure the split fluorescence OL provided from the dispersive element 230. The sensor 250 may generate a spectrum signal of the fluorescence OL. The sensor 250 may provide the spectrum signal to the processor 130.

In an example, as illustrated in FIG. 5, an image sensor 200b including a spectrum filter 232 may be provided. The image sensor 200b may include the slit element 210, the collimating lens 220, the spectrum filter 232, the condensing lens 240, and the sensor 250. The slit element 210, the collimating lens 220, the condensing lens 240, and the sensor 250 may be substantially the same as those described with reference to FIG. 4. The spectrum filter 232 may be a set of filters that pass rays of light of different wavelength bands, respectively. The spectrum filter 232 may filter the fluorescence OL provided from the collimating lens 220 to have spatially different wavelengths. That is, portions of the fluorescence OL having passed through different regions of the spectrum filter 232 may have different wavelengths. The fluorescence OL split by the spectrum filter 232 may pass through the condensing lens 240 and then be provided to the sensor 250. The sensor 250 may generate a spectrum signal of the fluorescence OL. The sensor 250 may provide the spectrum signal to the processor 130.

The processor 130 may generate a hyperspectral image of the object OBJ based on the spectrum signal. The processor 130 may determine the state of the object OBJ by using the hyperspectral image of the object OBJ.

Figure 6:
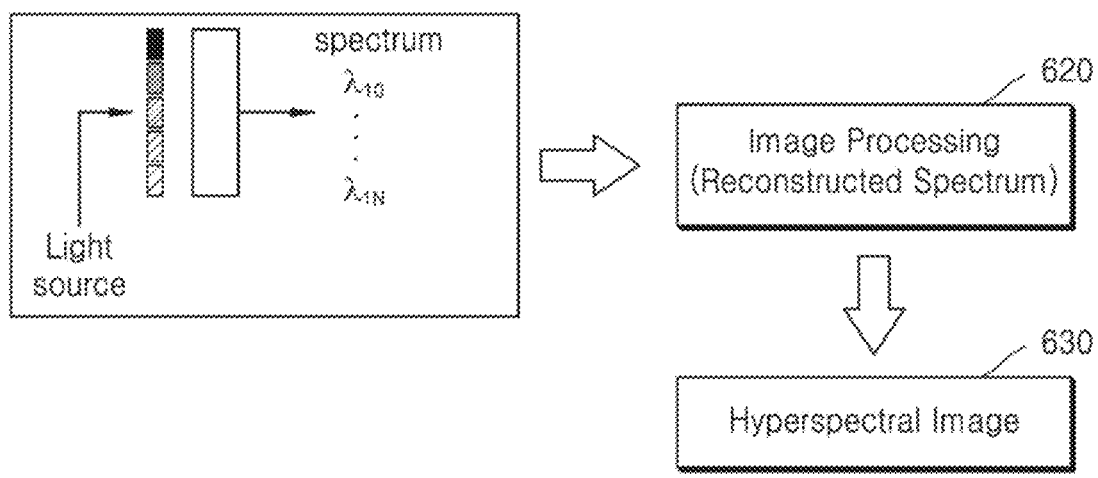
FIG. 6 is a schematic diagram illustrating an operation of an imaging device, according to some example embodiments.

FIG. 6 is a schematic diagram illustrating an operation of an imaging device, according to some example embodiments.

Referring to FIG. 6, the image sensor 120 may obtain spectrum data (or a spectrum signal) of an object by using a filter array.

The spectrum data obtained by the image sensor 120 may include, for example, information about the intensity of light at N+1 (n being an integer equal to or greater than one) wavelengths $\lambda_{10}, \ldots, \lambda_{1N}$. The processor 130 of the imaging device 10 may perform image processing 620 on the obtained spectrum data. Here, the image processing 620 may refer to processing for obtaining a hyperspectral image 630 of the object. Furthermore, the image processing 620 may include a spectrum reconstruction process for generating reconstructed spectrum data from input spectrum data.

The image sensor 120 may include a plurality of pixels. The plurality of pixels may correspond to a plurality of wavelength bands, respectively, or may include a plurality of subpixels corresponding to a plurality of wavelength bands, respectively. For example, first subpixels may measure light of a first wavelength band, and second subpixels may measure light of a second wavelength band different from the first wavelength band.

In order to increase the resolution of the image sensor 120 (e.g., spatial resolution or spectral resolution), it may be desirable to implement a small pixel size. However, as the pixel size of the image sensor 120 is decreased, an effect of crosstalk may occur between adjacent pixels. Therefore, for imaging at an appropriate resolution, an effect of crosstalk needs to be compensated for. In particular, the spatial resolution and the spectral resolution of the image sensor 120 for hyperspectral imaging are inversely proportional to each other. Accordingly, in order for the image sensor 120 to perform hyperspectral imaging at an appropriate spatial resolution and spectral resolution, a method for compensating for an effect of crosstalk may be used.

Figure 7:
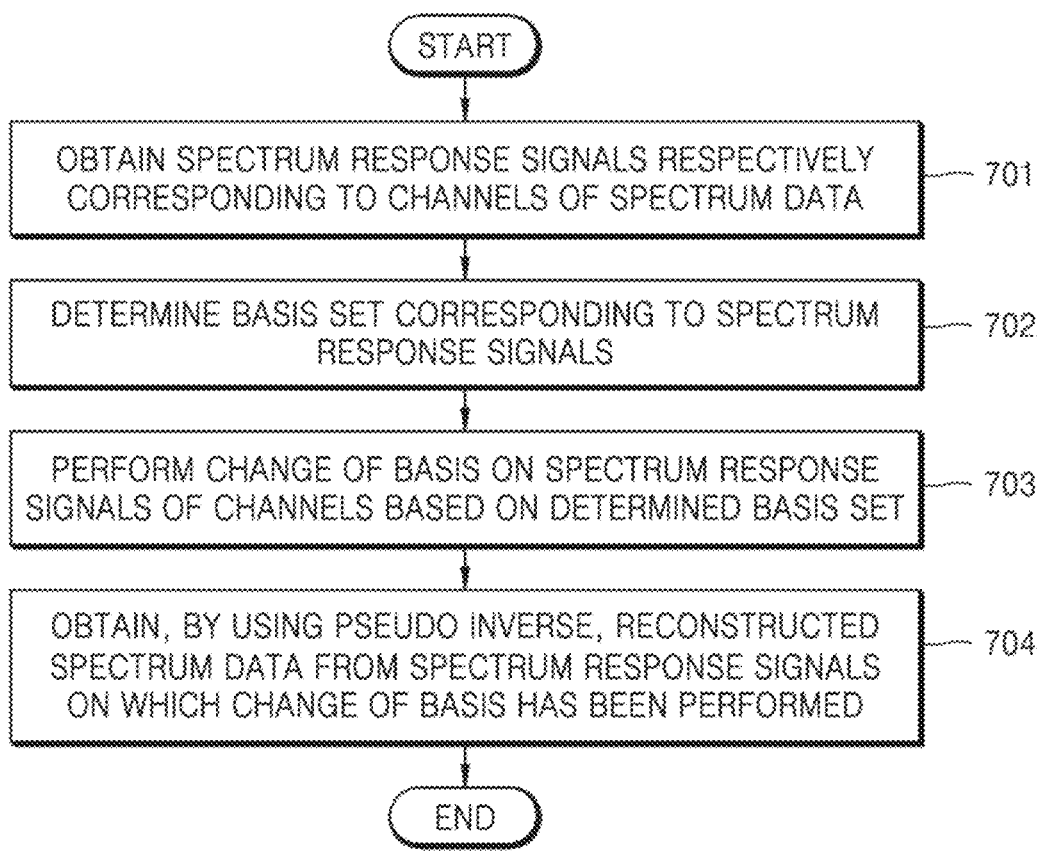
FIG. 7 is a flowchart of a method of processing spectrum data of an image sensor to generate reconstructed spectrum data, according to some example embodiments.

FIG. 7 is a flowchart of a method of processing spectrum data of an image sensor to generate reconstructed spectrum data, according to some example embodiments. The method of processing spectrum data of FIG. 7 may be performed by the imaging device 10 described above.

In operation 701, the processor 130 obtains a spectrum response signal (or a spectrum response function) corresponding to each channel of spectrum data obtained by the image sensor 120.

The spectrum data obtained by the image sensor 120 may include spectrum data (or a spectrum signal) of a plurality of channels corresponding to respective wavelengths, and the spectrum data may include spectrum response signals indicating spectrum characteristics corresponding to the respective plurality of channels.

In detail, the spectrum response signal of each channel may be represented by Equation 1.

$$D = \int d\lambda f(\lambda) I(\lambda) \approx \sum_{i=1}^{L} f(\lambda_i) I(\lambda_i) \Delta \lambda \quad \text{[Equation 1]}$$

In Equation 1, $f(\lambda)$, $I(\lambda)$, and D denote a spectrum of a filter, a spectrum of incident light, and the intensity of detected light, respectively. In addition, L denotes the number of channels of the spectrum data.

Equation 1 regarding the spectrum response signal of each channel may be represented by Equation 2 in a matrix form.

$$D \equiv \begin{pmatrix} D_1 \\ \vdots \\ D_N \end{pmatrix} = \begin{pmatrix} f_1(\lambda_1) & \cdots & f_1(\lambda_L) \\ \vdots & \ddots & \vdots \\ f_N(\lambda_1) & \cdots & f_N(\lambda_L) \end{pmatrix} \begin{pmatrix} I(\lambda_1) \\ \vdots \\ I(\lambda_L) \end{pmatrix} \equiv FI \quad \text{[Equation 2]}$$

In operation 702, the processor 130 determines a basis set corresponding to the spectrum response signals. Here, the processor 130 may use a principal component analysis (PCA) algorithm. In detail, the processor 130 may obtain a principal component with respect to the spectrum response signal of each channel by performing PCA, and determine the basis set with respect to the channels based on the obtained principal component.

The determined basis set may include the same number of bases as the number of channels of the spectrum. As another example, the determined basis set may include a smaller number of bases than the number of channels of the spectrum. As the number of bases is increased, the spectral resolution may be increased, but the image sensor 120 may be sensitive to noise. On the other hand, as the number of bases is decreased, the image sensor 120 may be relatively insensitive to noise, but the spectral resolution may be decreased. Therefore, the performance of the reconstructed spectrum data may be adjusted by optimizing the number of bases to be included in the basis set according to the characteristics of the imaging device.

In operation 703, the processor 130 performs a change of basis on the spectrum response signals of the channels, based on the determined basis set. As the change of basis is performed on the spectrum response signal of each channel, the spectrum response signal of each channel may have orthogonality. Consequently, an effect of crosstalk between the channels may be reduced, and thus, errors in spectrum reconstruction using a pseudo inverse may be reduced.

In operation 704, the processor 130 generates, by using the pseudo inverse, reconstructed spectrum data from the spectrum response signals on which the change of basis has been performed. That is, the processor 130 may generate the reconstructed spectrum data in which the effect of crosstalk is compensated for, from input spectrum data, by performing the change of basis and using the pseudo inverse with respect to the spectrum data obtained by the image sensor 120.

Figure 8:
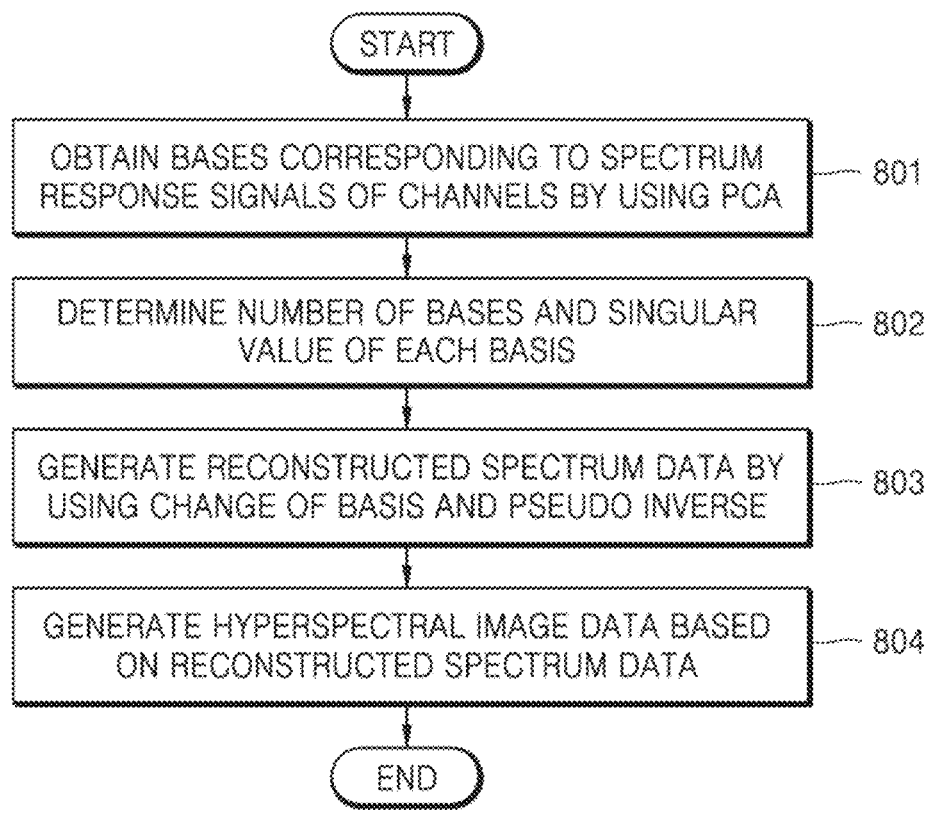
FIG. 8 is a flowchart of a method of processing spectrum data of an image sensor to generate reconstructed spectrum data, according to some example embodiments.

FIG. 8 is a flowchart of a method of processing spectrum data of an image sensor to generate reconstructed spectrum data, according to some example embodiments. The method of FIG. 8 may also be applied to operations 702 to 704 of FIG. 7.

In operation 801, the processor 130 obtains a principal component with respect to a spectrum response signal of each channel by using a PCA algorithm, and obtains bases corresponding to the spectrum response signals of the channels, based on the obtained principal component.

In operation 802, the processor 130 may perform the following processing schemes to select only meaningful (or optimal) bases from among the obtained bases and perform a change of basis.

In detail, in order to select only the meaningful bases, a matrix F may be expressed as a singular value decomposition (SVD) as shown in Equation 3.

$$F = U \Sigma V^T \quad \text{[Equation 3]}$$

In Equation 3, $\Sigma$ denotes an N×L-dimensional diagonal matrix, $U, V^T$ denote N×N, L×L-dimensional unitary matrices, respectively, and the SVD may be possible for any matrix F.

In order to determine a unique SVD, the diagonal elements of the matrix $\Sigma$ are usually arranged in descending order of magnitude, and the values of the diagonal elements may be defined as singular values.

In the basis converted into the unitary matrices U,V, the spectrum response signal may be represented by Equation 4.

$$D = FI = U\Sigma V^T I \Rightarrow \tilde{D} = U^T D = \Sigma V^T I = \Sigma \tilde{I}$$

$$\tilde{I} = (\Sigma^T \Sigma)^{-1} \Sigma^T \tilde{D} \quad \text{[Equation 4]}$$

Small singular values may amplify noise when their inverses are used. Accordingly, in order to exclude small singular values, it may be desirable to use only a few singular values greater than or equal to a preset magnitude. Accordingly, a truncation matrix may be used for removing small singular values that may cause noise.

A conventional PCA method as shown in Equation 5 is a dimensionality reduction method of replacing all small singular values with 0 and removing singular eigenvectors corresponding to the small singular values.

$$\hat{\Sigma} = Trunc(\Sigma) = \begin{pmatrix} s_1 & 0 & 0 & 0 \\ 0 & s_2 & 0 & 0 \\ 0 & 0 & (s_3 \ll 1 \to 0) & 0 \end{pmatrix} \quad \text{[Equation 5]}$$

However, in an example embodiment, a method of equally replacing small singular values with the previous smallest values by using a truncation matrix of Equation 6 modified from the conventional PCA (e.g., Equation 5) is used, rather than regarding them as 0's, such that dimensionality reduction is not performed. Accordingly, compared to the conventional method (e.g., Equation 5), the method of an example embodiment may minimize information lost due to dimensionality reduction.

$$\Sigma = Trunc(\Sigma) = \begin{pmatrix} s_1 & 0 & 0 & 0 \\ 0 & s_2 & 0 & 0 \\ 0 & 0 & (s_3 < s_2 \to s_2) & 0 \end{pmatrix}$$ [Equation 6]

The processor 130 may perform the processing method described above to determine a number of bases that have a preset threshold value or greater and singular values of the bases among the bases obtained in operation 801 and thus determine a basis set.

As another example, when there is a basis, the singular value of which is less than or equal to a threshold value, the processor 130 may determine the basis set by replacing the singular value of the basis that is less than or equal to the threshold value with the threshold value or with the lowest value among the singular values greater than or equal to the threshold value.

That is, the processor 130 may determine at least one basis having a singular value less than the threshold value among bases corresponding to the obtained spectrum response signals, and replace the singular value of the determined at least one basis with a certain singular value. Accordingly, the basis set may include at least one basis, the singular value of which is replaced with a certain singular value. The certain singular value may be the threshold value or the lowest value among the singular values of other bases having a singular value greater than or equal to the threshold value.

In operation 803, the processor 130 performs a change of basis on the spectrum response signals of the channels, based on the determined basis set, and generates reconstructed spectrum data from the spectrum response signals on which the change of basis has been performed, by using a pseudo inverse. That is, the processor 130 may generate, from input spectrum data, the reconstructed spectrum data in which the effect of crosstalk is compensated for, by performing the change of basis and using the pseudo inverse with respect to the spectrum data obtained by the image sensor 120.

The processor 130 may obtain a spectrum I(λ) of incident light by using a pseudo inverse as shown in Equation 7.

$$I=(F^TF)^{-1}F^TD$$ [Equation 7]

A reconstructed spectrum D may be obtained by using pseudo inverses Ĩ, D̃ having elements truncated by the truncation matrix described with reference to Equation 6.

In operation 804, the processor 130 may generate hyperspectral image data based on the reconstructed spectrum data. For example, the reconstructed spectrum data D may be converted into values of an XYZ color space by using Equation 8, which is an XYZ color matching function of the CIE color space.

$$X=\int d\lambda S(\lambda)R(\lambda)x(\lambda)=\int d\lambda I(\lambda)x(\lambda)$$

$$Y=\int d\lambda S(\lambda)R(\lambda)y(\lambda)=\int d\lambda I(\lambda)y(\lambda)$$

$$Z=\int d\lambda S(\lambda)R(\lambda)z(\lambda)=\int d\lambda I(\lambda)z(\lambda)$$ [Equation 8]

In addition, values of an XYZ color space may be converted into values of an RGB color space by using Equation 9.

$$\begin{bmatrix} R \\ G \\ B \end{bmatrix} = \begin{bmatrix} 0.41847 & -0.15866 & -0.082835 \\ -0.091169 & 0.25243 & 0.015708 \\ 0.00092090 & -0.0025498 & 0.17860 \end{bmatrix} \begin{bmatrix} X \\ Y \\ Z \end{bmatrix}$$ [Equation 9]

The processor 130 may obtain image pixel data constituting a hyperspectral image by converting the reconstructed spectrum data into values of a certain color space.

That is, the processor 130 may perform imaging processing having an improved resolution (e.g., spatial resolution and/or spectral resolution) by generating hyperspectral image data in which an effect of crosstalk is reduced, based on the reconstruction spectrum data instead of input spectrum data obtained by the image sensor 120.

Figure 9:
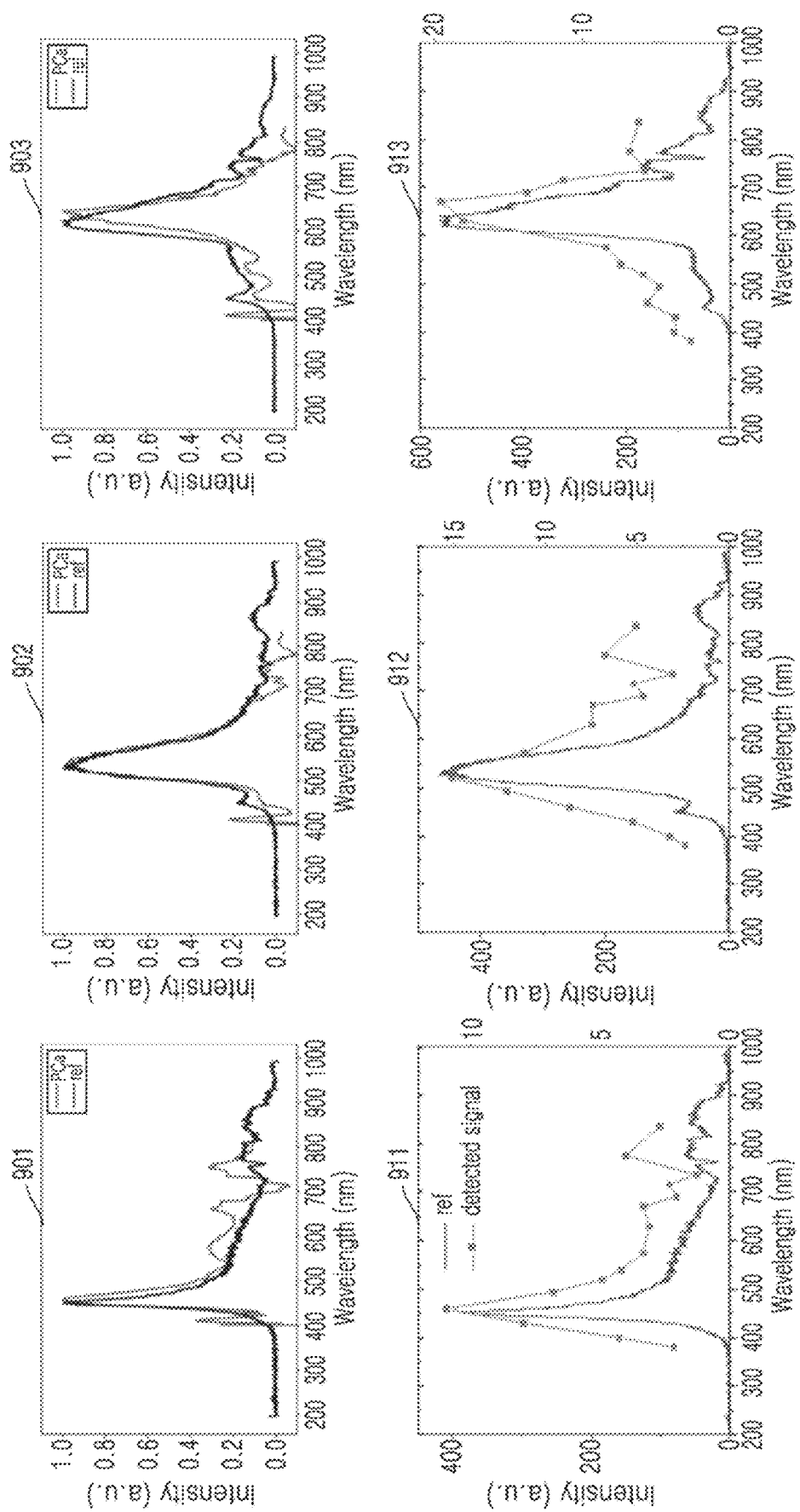
FIG. 9 is a diagram illustrating results of simulation of applying reconstructed spectrum data, according to some example embodiments.

FIG. 9 is a diagram illustrating results of simulation of applying reconstructed spectrum data, according to some example embodiments.

FIG. 9 shows graphs for comparing simulation results with respect to reconstructed spectrum data according to example embodiments, with simulation results of spectrum data to which a reconstruction scheme according to the example embodiments is not applied.

Graphs 901, 902, and 903 represent spectrum data reconstructed from a blue patch, a green patch, and a red patch of a Macbeth color chart measured under a fluorescent lamp, according to example embodiments. The measured spectra represent signals having passed through 15 filters, with respect to the center wavelength of each filter.

Graphs 911, 912, and 913 represent spectrum data obtained by measuring a blue patch, a green patch, and a red patch of a Macbeth color chart under a fluorescent lamp. That is, the graphs 911, 912, and 913 are based on the spectrum data to which the reconstruction scheme according to the example embodiments is not applied. Likewise, the measured spectra represent signals having passed through 15 filters, with respect to the center wavelength of each filter.

Comparing the graphs 901, 902, and 903 with the graphs 911, 912, and 913, respectively, the graphs based on the reconstructed spectrum data according to the example embodiments are measured to be similar to the reference spectra than the spectrum data without the reconstruction scheme of the example embodiments, and thus, it may be seen that the effect of crosstalk is reduced.

Figure 10:
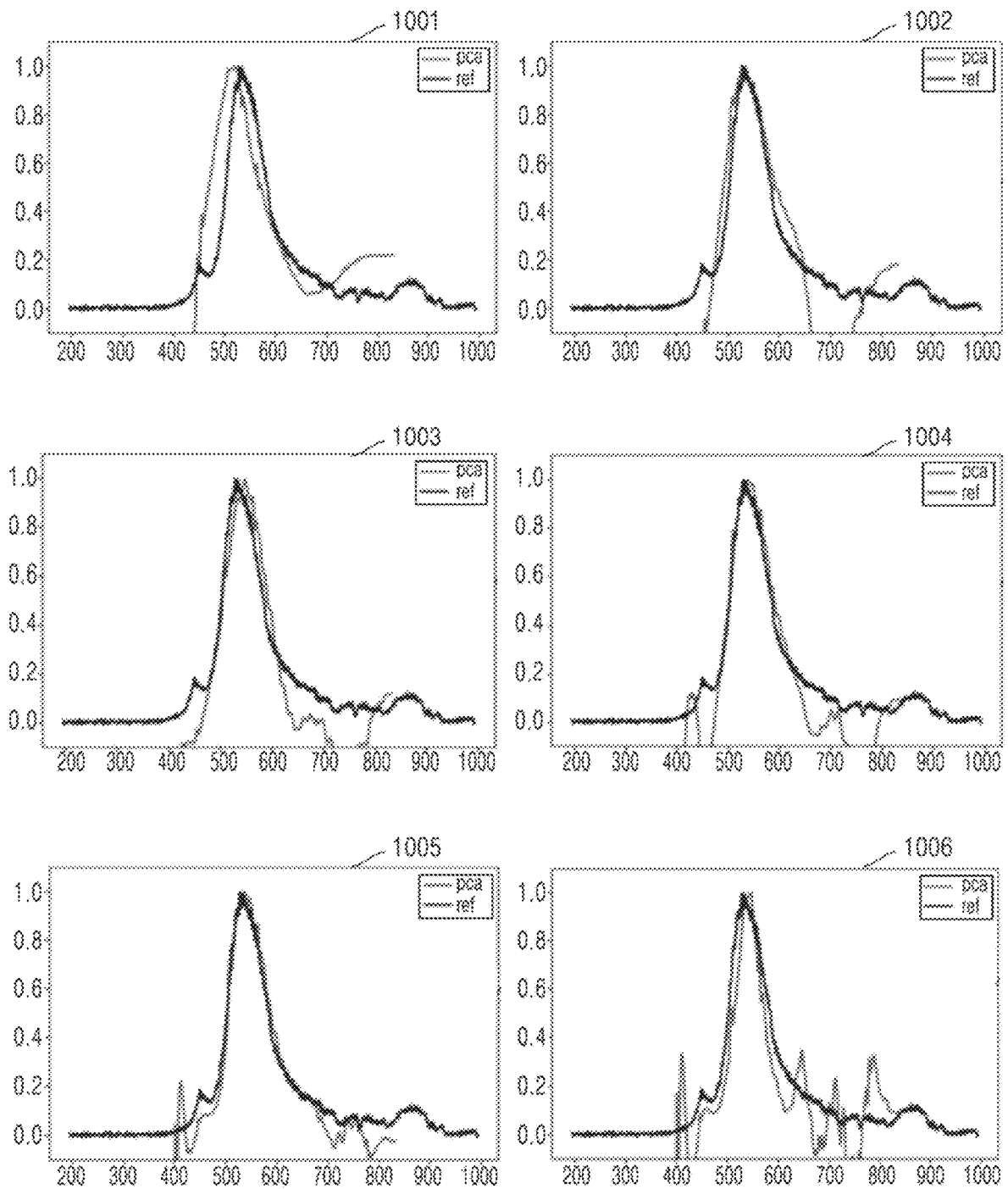
FIG. 10 is a diagram illustrating an influence of a number of bases on a performance of reconstructed spectrum data, according to some example embodiments.

FIG. 10 is a diagram illustrating an influence of the number of bases on the performance of reconstructed spectrum data, according to some example embodiments.

Referring to FIG. 10, graphs 1001 to 1006 represent simulation results of spectrum data reconstructed by using different numbers of bases, the numbers ascending in the order of the corresponding reference numerals. The graphs 1001 to 1006 shows that, as the number of bases is increased, the spectral resolution may be increased but the data may be sensitive to noise. On the other hand, the graphs 1001 to 1006 show that, as the number of bases is decreased, the data may be insensitive to noise but the spectral resolution may be decreased. Therefore, the performance of reconstructed spectrum data may be adjusted by optimizing the number of bases to be included in a basis set according to the characteristics of the imaging device.

Figure 11:
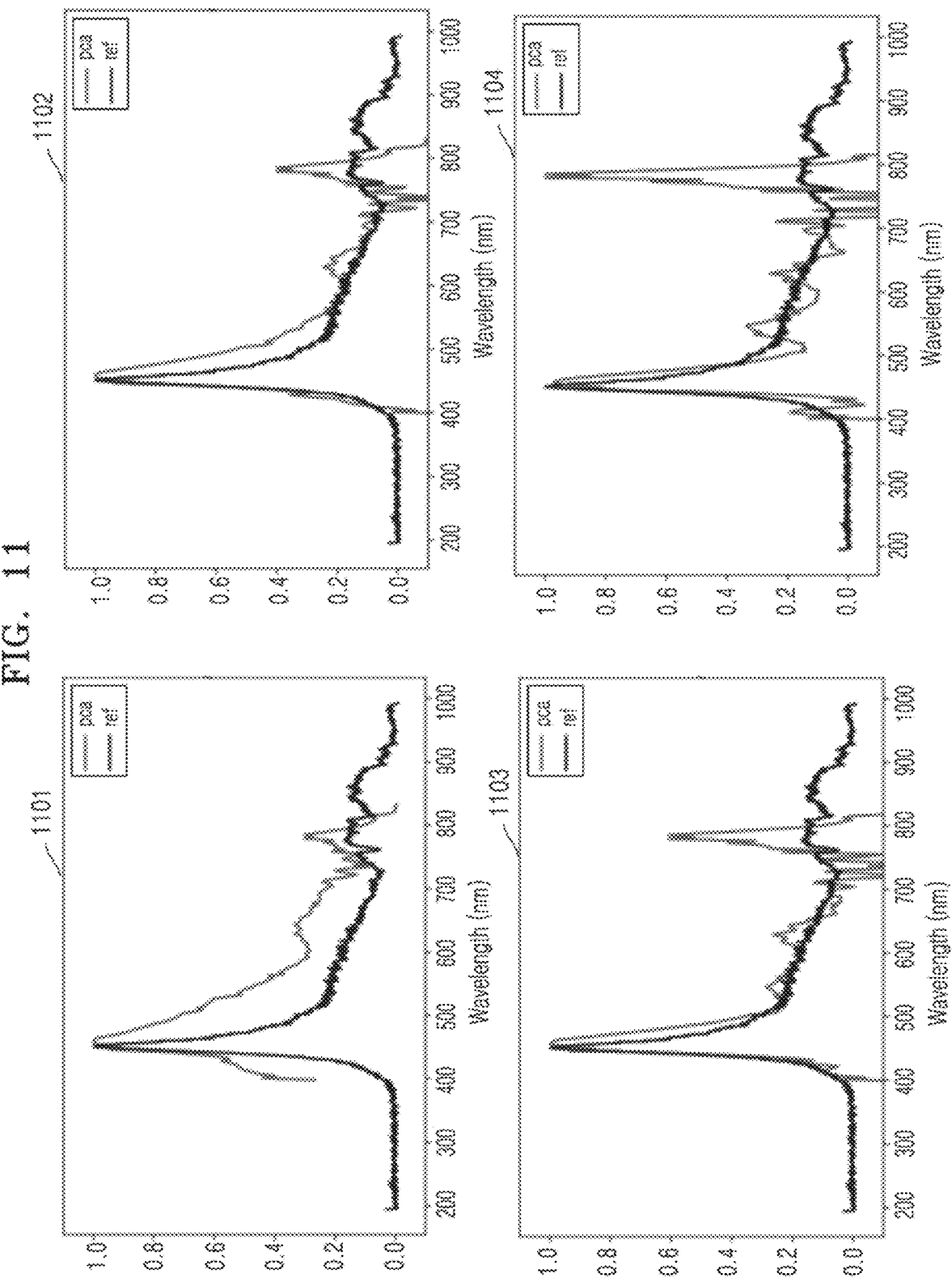
FIG. 11 is a diagram illustrating an influence of singular values of a basis, according to some example embodiments.

FIG. 11 is a diagram illustrating an influence of singular values of a basis, according to some example embodiments.

Referring to FIG. 11, graphs 1101, 1102, 1103, and 1104 represent results of performing spectrum reconstruction by setting threshold values to singular values of bases having first, fifth, ninth, and thirteenth magnitudes, respectively, among a total of 14 bases (that is, among 14 magnitudes of bases arranged from smallest to greatest).

As the number of bases maintaining their original singular values is increased, the spectral resolution may be maintained to be high but the data may be sensitive to noise. On the other hand, as the number of bases maintaining their original singular values is decreased, the spectral resolution may be decreased, but distortion due to noise may be reduced.

Figure 12:
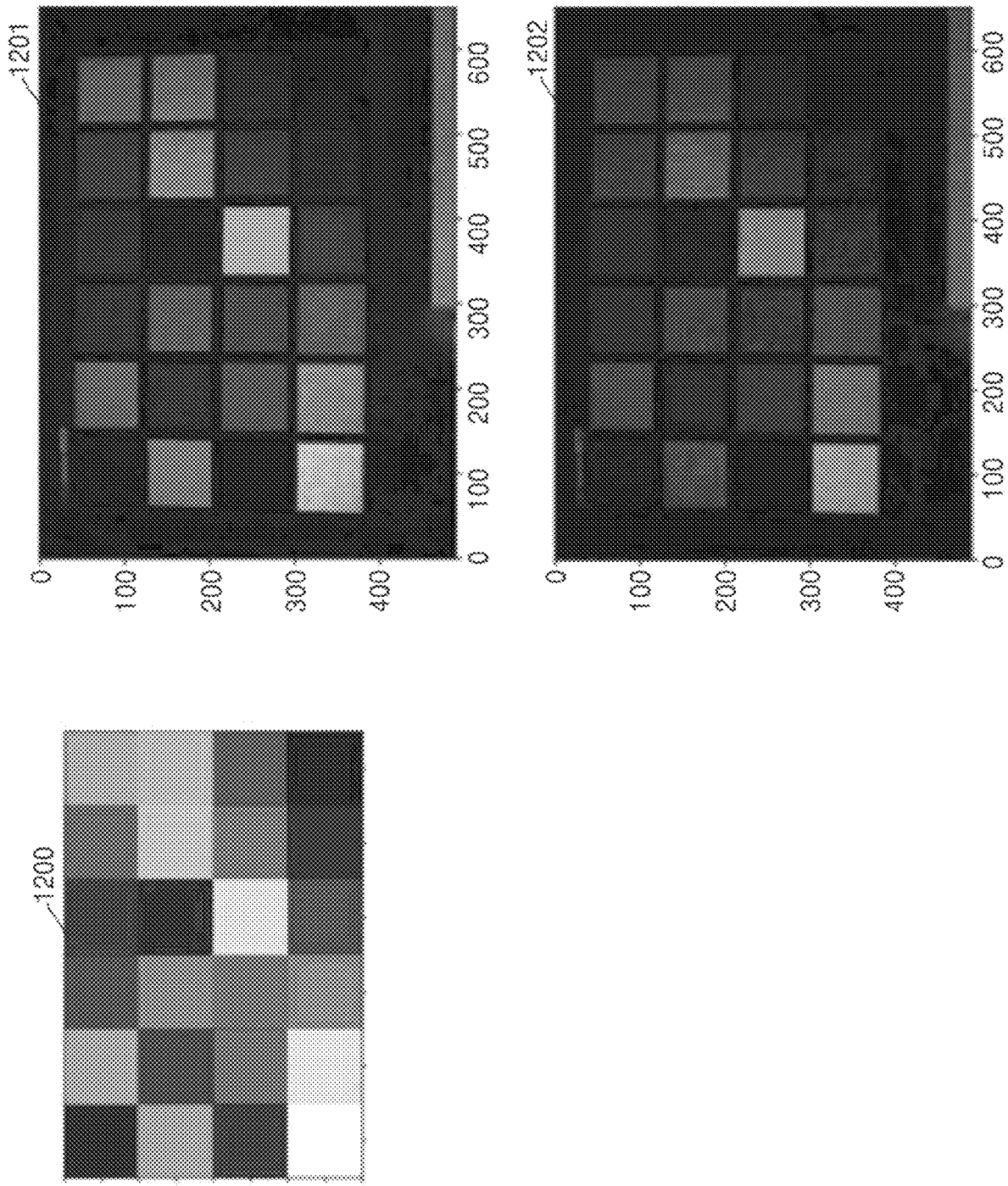
FIG. 12 is a diagram illustrating RGB conversion of reconstructed spectrum data, according to some example embodiments.

FIG. 12 is a diagram illustrating RGB conversion of reconstructed spectrum data, according to some example embodiments.

FIG. 12 illustrates an original image 1200, an RGB image 1201 that is color-converted from reconstructed spectrum data with respect to the original image 1200 according to the example embodiments, and an RGB image 1202 that is expressed with channels corresponding to R, G, and B wavelengths without reconstruction, with respect to the original image 1200. Comparing the RGB image 1201 with the RGB image 1202, it may be seen that the RGB image 1201 that is color-converted from the reconstructed spectrum data according to the example embodiments may be more improved in color representation than the RGB image 1202.

The above-described method may be provided by using a non-transitory computer-readable recording medium having recorded thereon one or more programs including instructions for executing the method. Examples of the computer-readable recording medium include magnetic media such as hard disks, floppy disks, or magnetic tapes, optical media such as CD-ROMs or digital video discs (DVDs), magneto-optical media such as floptical disks, and hardware devices such as ROM, RAM, and flash memory, which are specially configured to store and execute program instructions. Examples of the program instructions include not only machine code, such as code made by a compiler, but also high-level language code that is executable by a computer by using an interpreter or the like.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A method of processing spectrum data, the method comprising:
   obtaining spectrum response signals corresponding to channels of spectrum data of light, the spectrum data being obtained from an object by an image sensor;
   determining a set of bases corresponding to the obtained spectrum response signals;
   performing, based on the determined set of bases, a change of basis on at least one basis included in the determined set of bases; and
   generating, by using a pseudo inverse, reconstructed spectrum data from the spectrum response signals on which the change of basis has been performed,
   wherein the performing the change of basis comprises:
      determining at least one basis having a singular value, which is less than a threshold value, among the bases corresponding to the obtained spectrum response signals; and
      replacing the singular value of the determined at least one basis with a certain singular value.

2. The method of claim 1, wherein the determining the set of bases comprises obtaining a principal component with respect to a spectrum response signal of each channel by using a principal component analysis (PCA) algorithm.

3. The method of claim 1, wherein the set of bases comprises bases, a number of which is less than or equal to a number of the channels.

4. The method of claim 1, wherein the certain singular value is the threshold value or a lowest value among singular values of other bases, in the bases corresponding to the obtained spectrum response signals, each having a singular value greater than or equal to the threshold value.

5. The method of claim 1, further comprising generating a hyperspectral image, based on the generated reconstructed spectrum data.

6. The method of claim 5, wherein the generating the hyperspectral image comprises generating an RGB image, which is color-converted from the reconstructed spectrum data by using a color matching function.

7. The method of claim 1, wherein the channels of spectrum data comprises three or more channels.

8. The method of claim 1, wherein the threshold value is determined based on a singular value of an n-th singular value, among singular values of the bases corresponding to the obtained spectrum response signals in an order from smallest to greatest, n being a natural number.

9. A device for processing spectrum data, the device comprising:
   a light source configured to irradiate light toward an object;

an image sensor configured to obtain spectrum response signals corresponding to channels of spectrum data of light, the spectrum data being obtained from the object by the image sensor; and a processor configured to:
  determine a set of bases corresponding to the obtained spectrum response signals;
  perform, based on the determined set of bases, a change of basis on at least one basis included in the determined set of bases; and
  generate, by using a pseudo inverse, reconstructed spectrum data from the spectrum response signals on which the change of basis has been performed,
wherein the processor is further configured to determine at least one basis having a singular value less than a threshold value among the bases corresponding to the obtained spectrum response signals, and replace the singular value of the determined at least one basis with a certain singular value.

10. The device of claim 9, wherein the set of bases is determined by obtaining a principal component with respect to a spectrum response signal of each channel by using a principal component analysis (PCA) algorithm.

11. The device of claim 9, wherein the set of bases comprises bases, a number of which is less than or equal to a number of the channels.

12. The device of claim 9, wherein the certain singular value is the threshold value or a lowest value among singular values of other bases, in the bases corresponding to the obtained spectrum response signals, each having a singular value greater than or equal to the threshold value.

13. The device of claim 9, wherein the processor is further configured to generate a hyperspectral image, based on the generated reconstructed spectrum data.

14. The device of claim 13, wherein the processor is further configured to generate the hyperspectral image by generating an RGB image, which is color-converted from the reconstructed spectrum data by using a color matching function.

15. The device of claim 9, wherein the image sensor comprises a multispectral image sensor configured to obtain spectrum data of three or more channels.

16. The device of claim 9, wherein the threshold value is determined based on a singular value of an n-th singular value, among singular values of the bases corresponding to the obtained spectrum response signals in an order from smallest to greatest, n being a natural number.

17. A non-transitory computer-readable recording medium having recorded thereon a program for executing a method of processing spectrum data, the method including:
  obtaining spectrum response signals corresponding to channels of spectrum data of light, the spectrum data being obtained from an object by an image sensor;
  determining a set of bases corresponding to the obtained spectrum response signals;
  performing, based on the determined set of bases, a change of basis on at least one basis included in the determined set of bases; and
  generating, by using a pseudo inverse, reconstructed spectrum data from the spectrum response signals on which the change of basis has been performed,
wherein the performing the change of basis comprises:
  determining at least one basis having a singular value, which is less than a threshold value, among the bases corresponding to the obtained spectrum response signals; and
  replacing the singular value of the determined at least one basis with a certain singular value.

* * * * *